T. C. CRAVEN.
Improvement in Railway-Car Wheels.

No. 129,655.  Patented July 23, 1872.

Witnesses.
N. C. Lombard
John Lombard

Inventor.
Thomas C. Craven,
by his Attorney,
James A. Woodbury

UNITED STATES PATENT OFFICE.

THOMAS C. CRAVEN, OF ALBANY, NEW YORK, ASSIGNOR TO JAMES A. WOODBURY, OF WINCHESTER, MASSACHUSETTS.

IMPROVEMENT IN RAILWAY CAR-WHEELS.

Specification forming part of Letters Patent No. 129,655, dated July 23, 1872.

*To all whom it may concern:*

Be it known that I, THOMAS C. CRAVEN, of Albany, in the county of Albany and State of New York, have invented a new and useful Improvement in the Construction of Car-Wheels; and I do hereby declare that the following is a full, clear, and exact description of the same, reference being had to the annexed drawing making a part of this specification.

Description of the Drawing.

Similar letters of reference indicate corresponding parts in the two figures.

General Description.

To enable those skilled in the art to fully understand and construct my invention, I will proceed to describe it.

Figure 1:
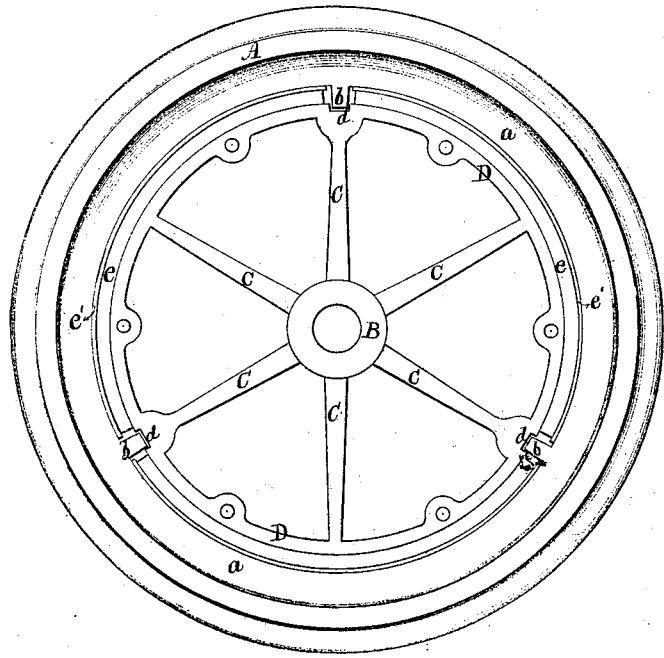
Figure 1 is a face view of my improvement, the rim or flange being removed.
Figure 2:
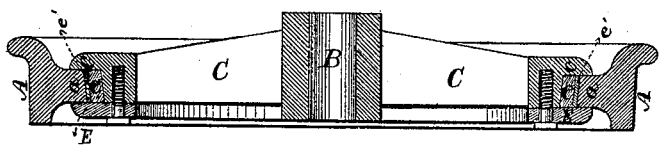
Fig. 2 is a transverse section of the same, the plane of section being through the center.

A represents the rim or tire of the wheel, which is cast separate from the other parts and is of the usual form, and having a strong rib, $a$, on its inner side, the outer edge or surface of said rib being beveled or inclined, as shown clearly in Fig. 2, and having lugs or projections $b$ upon it, any proper number of lugs being used—three being shown in Fig. 1. B represents the hub of the wheel, and C are the spokes, the outer ends of which are attached to a rim, D, having a flange, $c$, at one side. The hubs, spokes, and rim and flange are all cast in one piece, and the outer surface of the rim D is beveled or inclined, corresponding inversely with the bevel or inclination of the rim $a$. The rim D has recesses $d$ made in it to receive the lugs $b$, and the rim D is rather smaller in diameter than the rib $a$, so that strips of India rubber $e$ may be interposed between the rim D and rib $a$, the rubber strips having sheet-metal plates $e'$ at their outer sides. E represents a rim, which is connected by bolts $f$ with the rim D at the side opposite to that provided with the flange $c$. (See Fig. 2.)

From the above description it will be seen that when the rim D is fitted in the tire or rim A the beveled surfaces of the rib $a$ and rim D will cause the India rubber $e$ to be firmly compressed between the rib and rim, and the lugs $b$ will prevent the rim D from slipping around within the tire or rim A, and the rim D, spokes C, and hub B are prevented from moving laterally within the tire by means of the rim E and flange $c$, which bear against the sides of the rib $a$.

The advantages of this improvement in the construction of car-wheels are, that the tires A, when worn by use or broken, may be readily removed and new ones applied without removing the hub from the axle, and the India-rubber strips $e$ prevent that jarring and rumbling noise attending the wheels of usual construction.

I do not claim making or casting the tire or rim of the wheel separate from the spokes and hub, irrespective of the mode of securing the spokes within the tire.

Having thus described my invention, what I claim as new, and desire to secure by Letters Patent, is as follows:

Claim.

A car-wheel in which are combined a hub with a conical periphery, a detachable rim the inner surface of which coincides with the periphery of the hub, an intervening body of packing, and the devices described, or their equivalents, for adjusting the rim laterally and compressing the packing.

In testimony whereof I have signed my name to this specification in the presence of two subscribing witnesses.

THOS. C. CRAVEN.

Witnesses:
WARREN F. LELAND,
JAMES A. WOODBURY.